United States Patent
Joseph et al.

(10) Patent No.: US 7,578,444 B2
(45) Date of Patent: Aug. 25, 2009

(54) METHODS AND APPARATUS FOR DYNAMIC SIGNAL PROCESSING

(75) Inventors: Eugene Joseph, Coram, NY (US); Duanfeng He, S. Setauket, NY (US)

(73) Assignee: Symbol Technologies Inc, Holtsville, NY (US)

( * ) Notice: Subject to any disclaimer, the term of this patent is extended or adjusted under 35 U.S.C. 154(b) by 366 days.

(21) Appl. No.: 10/977,599

(22) Filed: Oct. 29, 2004

(65) Prior Publication Data

US 2006/0091219 A1 May 4, 2006

(51) Int. Cl.
G06K 7/10 (2006.01)
(52) U.S. Cl. .............................. 235/462.1; 235/462.11
(58) Field of Classification Search .......... 235/462.11, 235/462.24, 462.41, 462.1
See application file for complete search history.

(56) References Cited

U.S. PATENT DOCUMENTS 4,709,264 A * 11/1987 Tamura et al. ............. 358/479
5,754,670 A * 5/1998 Shin et al. .................. 382/321
6,795,200 B1 * 9/2004 Barman et al. ............. 356/606
2005/0157949 A1 * 7/2005 Aiso et al. .................. 382/299

FOREIGN PATENT DOCUMENTS

JP 2002044495 A * 2/2002

* cited by examiner

Primary Examiner—Karl D. Frech

(57) ABSTRACT

Methods and apparatus for providing dynamic signal processing with, in one exemplary embodiment, a fast swipe image scanner. Dynamic signal processing comprises determining the rate of motion of a dataform, for example a barcode, which is passed in front of the scanner's data collection module. Then, based on the rate of motion, applying a signal processing method to the dataform. The complexity of the selected signal processing method used to decode the dataform can be chosen based on the detected rate of motion of the dataform. In alternate embodiments two or more algorithms are processes concurrently.

49 Claims, 8 Drawing Sheets

METHODS AND APPARATUS FOR DYNAMIC SIGNAL PROCESSING

FIELD OF THE INVENTION

The invention is directed to dynamic signal processing and, more particularly to dynamic signal processing for fast swipe image scanners.

BACKGROUND OF THE INVENTION

There are numerous standards for identifying products that are sold throughout the world, for example, products are assigned Universal Product Codes (UPC) and/or European Article Numbers (EAN). These numeric codes allow businesses to identify products and manufactures, maintain vast inventories, manage a wide variety of products under a similar system and many other functions. The UPC or EAN of the product is printed, labeled, etched, or otherwise attached to the product as a dataform.

Dataforms are any indicia that can be used to identify the product, for example, dataforms can be barcodes, two dimensional codes, marks on the product, labels, signatures, signs etc. Dataforms such as, for example, barcodes are comprised of a series of light and dark rectangular areas of different widths. The light and dark areas can be arranged to represent the numbers of a UPC. Additionally, dataforms are not limited to products. They can be used to identify people, places, etc.

Some dataforms are more challenging to decode than others. The dataform may have become damaged during transport, or the dataform may be noisy because of dirt. Other challenging codes include super truncated barcodes, which are barcode that are very short in the vertical direction. Truncated codes are used on objects that are long and flat, for example, a pencil. Additionally, there are dataforms that encode information in two dimensions. Challenging dataforms can also comprise signatures or images.

Scanners that can decode the dataforms, such as for example, barcode scanners, have become very common. One category of scanner is a fast swipe scanner. These scanners can decode dataforms such as barcodes that are swiped past their readers at speeds of 50 inches per second. Fast swipe scanners have traditionally focused on laser technology, but image scanners can also be used in a fast swipe configuration.

Known fast swipe image scanners can process dataforms that pass their readers at 50 inches per second, but in order to process the codes quickly, a simple signal processing algorithm is used. Simple signal processing algorithms can effectively decode clear, one dimensional barcodes, but they may not be able to read challenging dataforms such as noisy codes, damaged codes, truncated codes, two-dimensional codes, signatures, images, etc. Thus, a traditional fast swipe image scanner equipped with a quickly processing algorithm cannot be used to read challenging codes. There are more sophisticated algorithms that can process challenging codes, but they require more time or an extremely powerful computer to complete. Since dataforms are moving quickly past the swipe scanner there may not be enough time to use a sophisticated algorithm.

Sometimes a dataform is moved at a slower speed past the swipe scanner. In these situations, there is enough time to use a sophisticated algorithm to decode the challenging dataform. Unfortunately known fast swipe image scanners, equipped with a simple signal processing algorithm, cannot take advantage of the extra time and do not decode the challenging dataform. Accordingly, a need exists for swipe scanners that can decode a wider range of dataforms by dynamically processing the dataforms.

SUMMARY OF THE INVENTION

The invention as described and claimed herein satisfies this and other needs, which will be apparent from the teachings herein. An embodiment of the invention includes methods and apparatus for dynamic signal processing in, for example, a fast swipe image scanner.

Fast swipe image scanners continuously take pictures within its field of view. In one exemplary embodiment of the invention, when a dataform is passed within the scanner's field of view, the scanner detects the dataform and determines the rate of motion, such as for example, the speed, of the dataform. Then, the scanner selects a signal processing algorithm to decode the dataform based on the rate of motion of the dataform, and uses the selected algorithm to decode the dataform.

In some embodiments, if the dataform is moving quickly and is above a predetermined rate of motion, a first, for example quick, signal processing algorithm can be used to decode the dataform. Alternatively, if the dataform is moving slowly or is stationary, and is at or below a predetermined rate of motion, a second, for example, more time intensive algorithm can be used to decode the dataform.

In alternate embodiments, the first signal processing algorithm is applied to at least some part of the captured images prior to determining the rate of motion of the dataform. If the first signal processing algorithm fails, the swipe scanner determines the rate of motion of the dataform, and if the dataform is moving within a predetermined range of motion between or including 0 and "X", wherein "X" represents a threshold rate of motion where the swipe scanner will have enough time to use the second algorithm, then the second algorithm is applied to the dataform.

Further, some embodiments of the invention are not limited to two algorithms. There can be several predetermined ranges of motion, associated with several signal processing algorithms that take different amounts of time to complete. Depending on the rate of motion of the dataform, one of the algorithms is used to decode the dataform.

An alternate embodiment of the invention provides for a method of dynamic signal processing where a data collection device, for example, a scanner, applies a first and second processing algorithm at the same time. The first algorithm is designed to complete before the capturing of the next image, while the second algorithm, takes more time to analyze a given image.

In another embodiment, the behavior of the fast swipe image scanner can be "reversed" to function as a surveillance device. For example, during an overnight period or when a store is closed, the image scanner can be arranged to detect motion. The scanner continuously captures images within its field of view and determines the rate of motion of objects that are depicted in the images. Then the scanner initiates an action based on the rate of motion of the object.

The action can be, but is not limited to, for example, an audible noise, a call to the authorities and/or an alert sent the owner. The alert can be, in some embodiments, a telephone call, a page and/or an email comprising a sample image of the moving object.

The types of action performed by the scanner can be varied, in some exemplary embodiments, based on the rate of motion detected. For example, if the motion is slight, the image scanner might merely save the image for later inspection. If the motion is greater, the image scanner can be configured to save images and alert the authorities. In addition, the scanner can be programmed to ignore expected motion so that moving objects, such as, for example, animated window displays, do not initiate an action from the scanner.

Other objects and features of the invention will become apparent from the following detailed description, considering in conjunction with the accompanying drawing figures. It is understood however, that the drawings are designed solely for the purpose of illustration and not as a definition of the limits of the invention.

BRIEF DESCRIPTION OF THE DRAWING FIGURES

The drawing figures are not to scale, are merely illustrative, and like reference numerals depict like elements throughout the several views.

DETAILED DESCRIPTION OF EXEMPLARY EMBODIMENTS

There will now be shown and described in connection with the attached drawing figures several exemplary embodiments of methods and apparatus for dynamic signal processing.

An exemplary fast swipe image scanner implemented in accordance with the invention dynamically chooses a signal processing algorithm, for dataform decoding, based on the rate of motion of the dataform. In one embodiment, if the dataform exhibits a lot of motion, the scanner uses a fast and simple algorithm to decode the dataform, but if the dataform exhibits little or no motion, the scanner uses a more sophisticated algorithm. Dataforms with little or no motion stay within the field of view of the scanner for a longer amount of time than dataforms that are moving quickly. The scanner uses the extra time available before the dataform disappears from its field of view, to capture and decode the challenging dataform. Thus long and short times can refer to the time available before the dataform disappears from the field of view of the scanner.

In another embodiment, the scanner initially uses the simple algorithm to try and decode passing dataforms, and if the simple algorithm fails, the scanner determines the rate of motion of the dataform to determine whether it has enough time to use the more sophisticated algorithm. If the motion of dataform is within a predetermined range of motion, the scanner attempts to decode the dataform using the sophisticated algorithm. In this embodiment the scanner determines the rate of motion of the dataform after the simple algorithm fails or concurrently with the simple algorithm.

In an additional embodiment of the invention, the scanner uses two or more algorithms concurrently to decode dataforms. The first algorithm is a simple and fast algorithm, while the second algorithm is more sophisticated and time intensive algorithm. The first algorithm is designed to complete before the scanner captures the next image so that every image is decoded by at least the first algorithm, while the second algorithm takes a longer time to complete and analyzes fewer images. Thus, the scanner can decode simple dataforms that are moving quickly using the first algorithm and, can also decode more challenging dataforms that are moving at a slower rate using the second algorithm.

In an alternate embodiment, the scanner can be operated in a surveillance mode. The scanner is set to detect motion and based on the rate of motion of an unexpected object, the scanner can be programmed to perform certain actions, such as saving an image of the moving object, contacting the owner and/or calling the authorities.

Thus, the exemplary fast swipe image scanner of the present invention expands the functionality of fast swipe image scanners to include the decoding of challenging codes and a surveillance mode without sacrificing the fast swipe functionality of the scanner.

Figure 1:
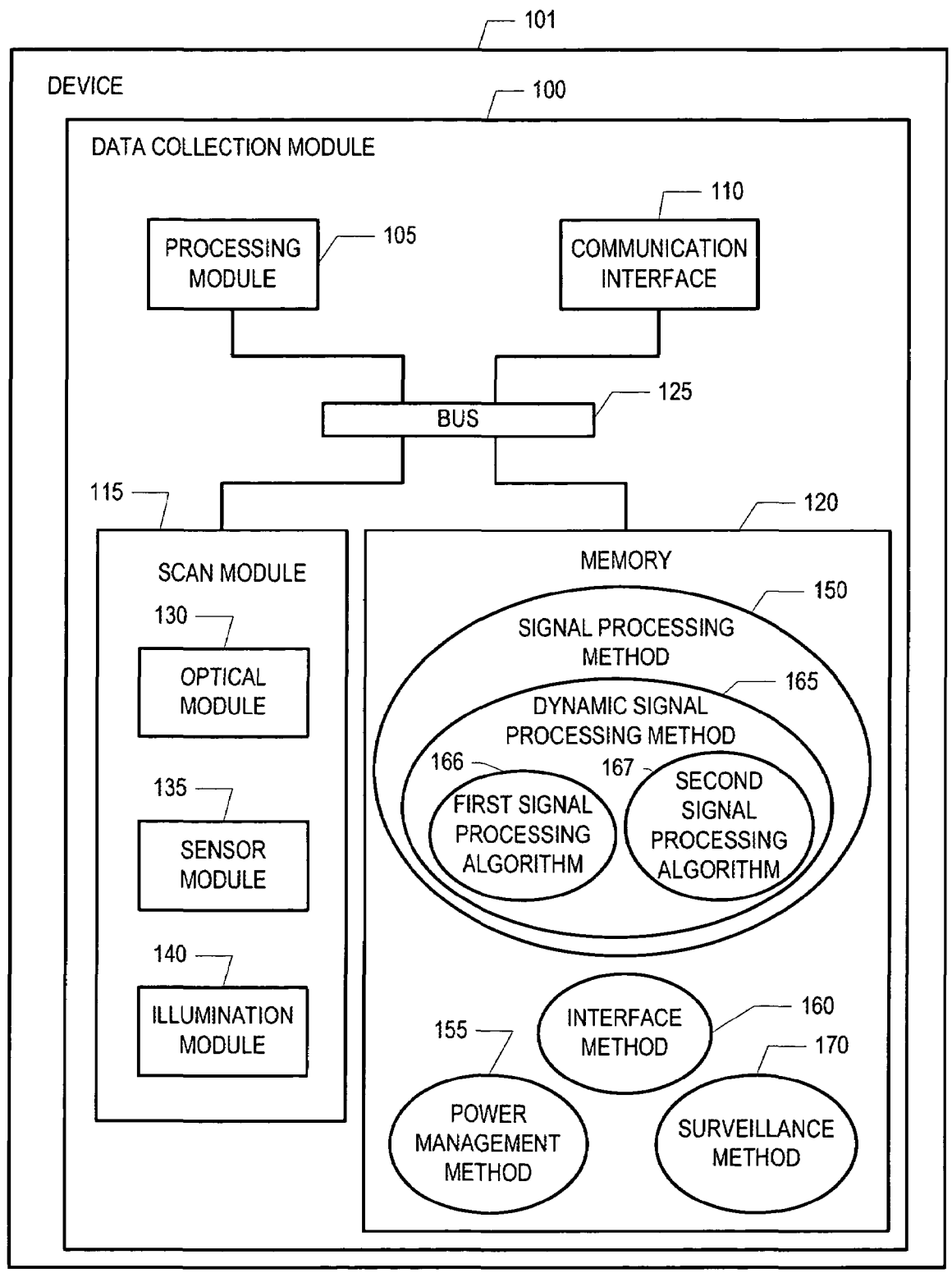
FIG. 1 illustrates an exemplary data collection module implemented according to an embodiment of the invention.

With reference to FIG. 1, there is shown an exemplary block diagram of a device 101 comprising a data collection module 100. The device 101 can be, in an exemplary embodiment, a checkout counter, a handheld scanner, a mobile computer, etc. The data collection module 100 can be, in one non-limiting exemplary embodiment, a swipe scanner module 100. The swipe scanner 100 can be integrated into the device 101. In addition, although the data collection module 100 is illustrated as being within device 101, in alternate embodiments, the data collection module 100 can be a separate module that is coupled to the device 101, by a wire or wirelessly. For example, in one embodiment, the data collection module 100 can be a convertible handheld/stationary scan gun coupled to a cash register.

Swipe scanner 100 comprises processing unit 105, scan module 115, memory 120 and communication interface 110 coupled together by bus 125. The modules of data collection module 100 can be implemented as any combination of software, hardware, hardware emulating software, and reprogrammable hardware. The bus 125 is an exemplary bus showing the interoperability of the different modules of the invention. As a matter of design choice there may be more than one bus and in some embodiments certain modules may be directly coupled instead of coupled to a bus 125.

Processing unit 105 can be implemented as, in exemplary embodiments, one or more Central Processing Units (CPU), Field-Programmable Gate Arrays (FPGA), etc. In an embodiment, the processing unit 105 can comprise a general purpose CPU that processes software and raw image data stored in memory 120. In other embodiments, modules of the processing unit 105 may be preprogrammed to perform functions, such as, for example, signal processing, interface emulation, etc. In alternate embodiments, one or modules of processing unit 105 can be implemented as an FPGA that can be loaded with different processes, from memory 120, and perform a plurality of functions. Processing unit 105 can comprise any combination of the processors described above.

Scan module 115 can be implemented as, in one exemplary embodiment, a camera 115 comprising an optical module 130, and a sensor module 135 and an illumination module 130. The optical module 130 can be, for example, the lens 130 of the camera 115. In some embodiments the optical module 130 can comprise of more than one lens and/or provided more than one focus point. In addition, the optical module 130 is not limited to lenses; any prism and/or other optical medium that is suitable for capturing images can be used to implement the optical module 130.

The sensor module 135 can be implemented, in one exemplary embodiment, as a Charged-Coupled Device (CCD). The CCD 135 records images in digital format for processing. In alternate embodiments, any sensor that captures images can be used to implement the sensor module 135, such as, for example, CMOS semiconductors. The illumination module 145, may be implemented, in one non-limiting exemplary embodiment, as one or more Light Emitting Diodes (LED) 145. Other illumination mediums may be used in alternate embodiments.

Memory 120 can be implemented as volatile memory, non-volatile memory and rewriteable memory, such as, for example, Random Access Memory (RAM), Read Only Memory (ROM) and/or flash memory. The memory 120 stores methods and processes used to operate the swipe scanner 100, such as, signal processing method 150, power management method 155, interface method 160 and surveillance method 170. The memory 120 can also be used to store raw image data and/or processed image data.

Scan module 115 continuously capture images within the field of view of the scanner 100. The images are analyzed by signal processing method 150 and image statistics are extracted from them. The swipe scanner 100 uses the image statistics to determine information, such as, for example, when a target dataform is in the image that was captured. When a target dataform is detected the exemplary image swipe scanner 100 of the invention uses dynamic signal processing method 165 to decode the dataform. The steps of exemplary dynamic signal processing methods are described below with reference to FIGS. 2-4.

An image swipe scanner operator may swipe objects as fast as 50 inches per second past the scanner 100. Thus, the image swipe scanner 100 takes many pictures per second, and has to analyze those pictures quickly to detect and decode swiped dataforms. Therefore, fast and simple algorithms have been favored for image swipe scanners. Unfortunately simple algorithms may not be able to decode challenging dataforms, such as, damaged codes or signatures, thus limiting the functionality of the scanner.

If a swipe scanner fails to read a dataform, there is a natural tendency to swipe the object again and/or to swipe at a slower speed or hold the object up to the scanner. In these cases, the image scanner has additional time to decode the dataform, and a more sophisticated and time intensive algorithm can be used to try and decode the dataform. Thus, the rate of motion of the dataform can be used to dynamically choose an optimal signal processing algorithm. For example, a more sophisticated and time consuming algorithm can be used to decode a dataform that is moving slowly.

In one exemplary embodiment, the rate of motion of the dataform is determined by the dynamic signal processing method 165 using the differences in image statistics from a series of contiguous images. The rate of motion can be the speed of the dataform, which can be determined from the distance the dataform moves between two contiguous images, or a statistical determination of the difference between two contiguous images, or any other method for determining the rate of motion of the dataform. In some embodiments, an external speed detector can be used to determine the speed of the dataform before the scanner 100 reads the dataform. In alternate embodiments the images used for rate of motion analysis can be near in time, rather than adjacent in time.

If the dataform is moving quickly, a first signal processing method 166 is used to decode the dataform. In this embodiment, the first signal processing algorithm is a simple algorithm that can be completed quickly. If the dataform is moving slowly, the swipe scanner 100 uses a second signal processing algorithm 167. This algorithm 167 is more time consuming than the first algorithm 166, but since the dataform is moving slowly, the swipe scanner 100 has more time to capture and decode the dataform before it leaves the field of view of the scanner 100. The second algorithm 167 is capable of decoding more challenging dataforms such as noisy codes, truncated codes, damaged codes, etc.

In an alternate embodiment, the dynamic signal processing method 165 concurrently processes captured images using both the first signal processing algorithm 166 and the second signal processing algorithm 167. In this embodiment, the first signal processing algorithm 166 decodes every picture taken by the scanner and is designed to complete, in a worse case scenario, before the next image is captured. The second signal processing algorithm 167 decodes less images and spends more time on each image. Processing between the algorithms can be divided and processed concurrently by a single processing unit, or in other embodiments the scanner can have two independent processing units.

The data collection module 100 can be implemented as a module for different devices 101 that communicate in a variety of languages. Therefore, data collection module 100 comprises an interface method 160 that translates the decoded dataform into the language of the device 101 that interfaces with the data collection module 100. Different interfaces include Universal Serial Bus (USB), scanner emulation, IBM keyboard wedge, SSI Interface, etc.

Power management method 155 manages the power used by swipe scanner 100. In some embodiments, the swipe scanner 100 can switch to a power save mode, when no activity is detected for a given amount of time. The power save mode can completely shut down the scanner 100 or alternatively, it can slow the image capture rate, or initiate other power saving techniques.

The swipe scanner 100 also comprises surveillance method 170 that operates the image swipe scanner as a surveillance device. For example, a swipe scanner 100 at a store can be switched to a security mode at night or whenever the store is closed. When motion is detected, the swipe scanner 100 is programmed to perform an action. The scanner 100 can be programmed to perform different actions based on the level of motion detected. For example, if the motion is slight, the scanner 100 can be programmed to save the image for later review. While if the detected motion is at a medium level the scanner contacts the owner via mobile phone or email, and optionally sends a picture of the detected motion. If the motion is great, the scanner 101 can be programmed to call the authorities and contact the owner.

The exemplary embodiment of FIG. 1 illustrates dynamic signal processing method 165 as part of signal processing method 150 and illustrates power management method 155, interface method 160 and surveillance method 170 as separate components, but these methods are not limited to this configuration. Each method in whole of part described herein can be separate components or can interoperate and share components. Additionally, although the methods are depicted in the memory 120, in alternate embodiments the methods can be incorporated permanently or variably in processing unit 105. In some embodiments, scan module 115 can be separate from the data collection module 100, and the data collection module can be implemented using a general purpose computer and software.

Memory 120 is illustrated as a single module in FIG. 1, but in some embodiments swipe scanner 100 can comprise more than one memory module. For example, the methods described above can be stored in separate memory modules.

In some embodiments, in order to increase the speed of processing images, signal processing method 150 can be transferred whole or in part to an FPGA. The FPGA obtains raw image data from the scan module 115 and produces images statistics. The image statistics are stored in memory with the raw image data for further processing, such as, for example, determining whether a dataform exists in the image. Transferring some of the image processing to an FPGA allows the swipe scanner 100 to determine the location of a dataform within an image in about 1 ms. Further information regarding hardware assisted signal processing can be found in U.S. patent application Ser. No. 10/901,515 entitled "Point-of-Transaction Workstation for Electro-Optically Reading One-Dimensional and Two-Dimensional Indicia by Image Capture", filed on Jul. 29, 2004, and assigned to Symbol Technologies, Inc., the entire contents of which are hereby incorporated by reference herein.

Figure 2:
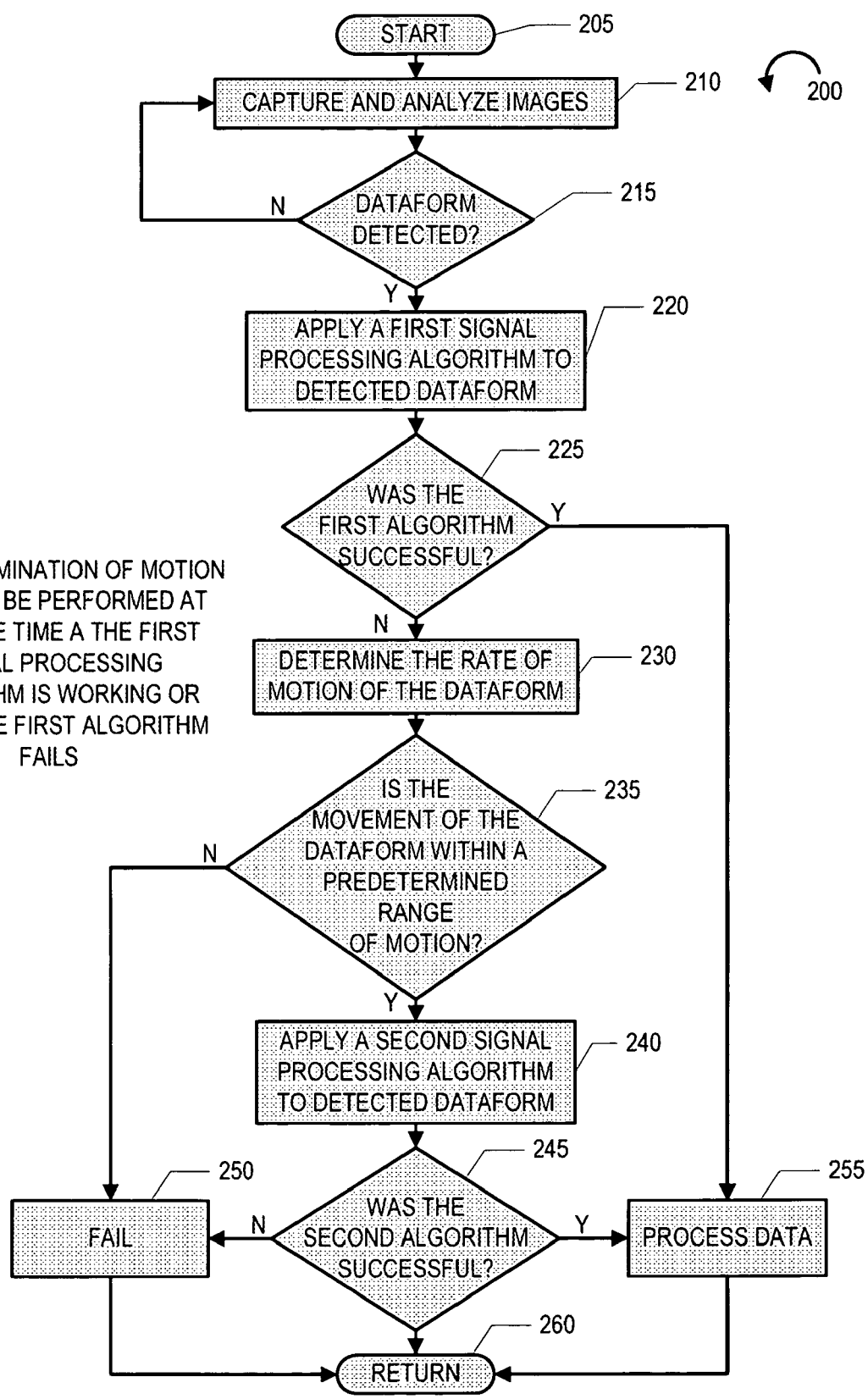
FIG. 2 illustrates an exemplary dynamic signal processing method implemented according to an embodiment of the invention.

FIG. 2 illustrates an exemplary embodiment of method 200 for implementing dynamic signal processing in accordance with the invention. Reference to swipe scanner 100 is made in the description of method 200. Dynamic signal processing method 200 begins with start step 205. In an exemplary embodiment, the method 200 begins when the swipe scanner 100 and/or device 101 is powered on. The device 101 and/or swipe scanner 100 can also run diagnostics prior to operation.

Processing proceeds to step 210, where the swipe scanner 100 continuously captures and analyzes images. In one exemplary embodiment, the raw image data is stored in memory 120, and signal processing method 150, under the control of processing unit 105, extracts images statistics from the raw image data. The image statistics indicate to the swipe scanner 100 whether a dataform or target is present in the image.

In an alternate embodiment, the captured images are transferred to an FPGA, which is loaded with a routine that determines images statistics. The raw image and the image statistics are then stored to memory 120, and the signal processing method 150, under the control of processing unit 105, can determine if a dataform or some other targeted object is present in the image from the image statistics.

Proceeding to step 215, if a dataform is not detected in the captured image processing returns to step 210, where the swipe scanner continues to take images. Returning to step 215, if a dataform is detected, processing proceeds to step 220. In step 220, a first signal processing algorithm is applied to the detected dataform. In an exemplary embodiment, the first signal processing algorithm, is a simple algorithm that can be completed quickly. The first algorithm can process dataforms such as a traditional barcodes, but it may not be sophisticated enough to process more challenging dataforms such as noisy codes, damaged codes, truncated codes, two-dimensional codes, signatures or images. In alternate embodiments, processing proceeds directly from step 210 to 220, where the first algorithm is applied to the captured images.

Processing proceeds to step 225, where the swipe scanner 100 determines whether the first algorithm 166 was successful. If the first algorithm 166 is successful, processing proceeds to step 255, where the decoded data is further processed. For example the data can be translated into a language that the device 101 can interpret. For example, if the swipe scanner 100 is attached to a cash register via a USB connection, the decoded dataform is translated into a serial form, in step 255, and communicated to the device through communication interface 110. Following step 255, processing of method 200 proceeds to step 260 where the method returns to step 210, and the swipe scanner 100 is ready to process the next dataform.

Returning to step 225, if the first algorithm was not successful, processing proceeds from step 225 to step 230, where the swipe scanner 100 determines the rate of motion, for example, the speed, of the dataform. As mention above, the speed of the dataform may be determined from the dataform's movement between successive images. Alternatively, the statistical change between contiguous images can be used as a metric for the rate of motion of the dataform. After the rate of motion of the dataform is determined, processing proceeds from step 230 to step 235. In alternate embodiments, the rate of motion determination step 230 can be performed at the same time as the first algorithm. In that embodiment, if the first algorithm is successful, the speed of the dataform can be ignored or used for another purpose, but if the first algorithm fails, the speed of the dataform is ready for step 235.

In step 235, the swipe scanner 100 determines whether the speed of the dataform falls within a predetermined range of motion. More specifically, if the dataform is moving at a speed between or including 0 and "X", processing proceeds to step 240, but if the speed of the dataform is above "X", processing proceeds to step 250. "X" can be a predetermined value chosen based on the amount of time it takes for the second algorithm 167 to complete. In other words, if the dataform is moving faster than "X", the swipe scanner 100 does not have enough time to perform the more time intensive algorithm 167.

If the speed of the dataform is not within 0 and "X", processing proceeds to step 250, where the swipe scanner 100 fails to decode the dataform. In some embodiments the swipe scanner 100 does nothing, and returns in step 260 to step 210, but in other embodiments the swipe scanner 100 can transmit a fail signal to the communication interface 110, or emit an audible fail indicator to the swipe scanner 100 operator. The device 101 can be programmed to alert the operator of the failure through an audible sound, or a message on a screen. Additionally, the scanner 100 and/or device 101 can instruct the operator to try again at a slower speed, or to hold the dataform up to the scanner 100.

Returning to step 235, if the speed of the dataform is within or at 0 and "X", processing proceeds to step 240, where a second signal processing algorithm 167 is applied to the dataform. The second algorithm 167 is more time consuming, but it is sophisticated enough to decode challenging codes. Proceeding from step 240 to step 245, if the second algorithm is not successful processing proceeds to failure step 250 and then returns in step 260 to step 210. In some embodiments the scanner 100 and/or device 101 can use a different failure tone or message. Returning to step 245, if the second algorithm is successful, processing proceeds from step 245 to processing step 255, and then returns in step 260 to step 210.

The steps of method 200 and other methods described herein are exemplary and the order of the steps may be rearranged as a matter of design choice.

Figure 3:
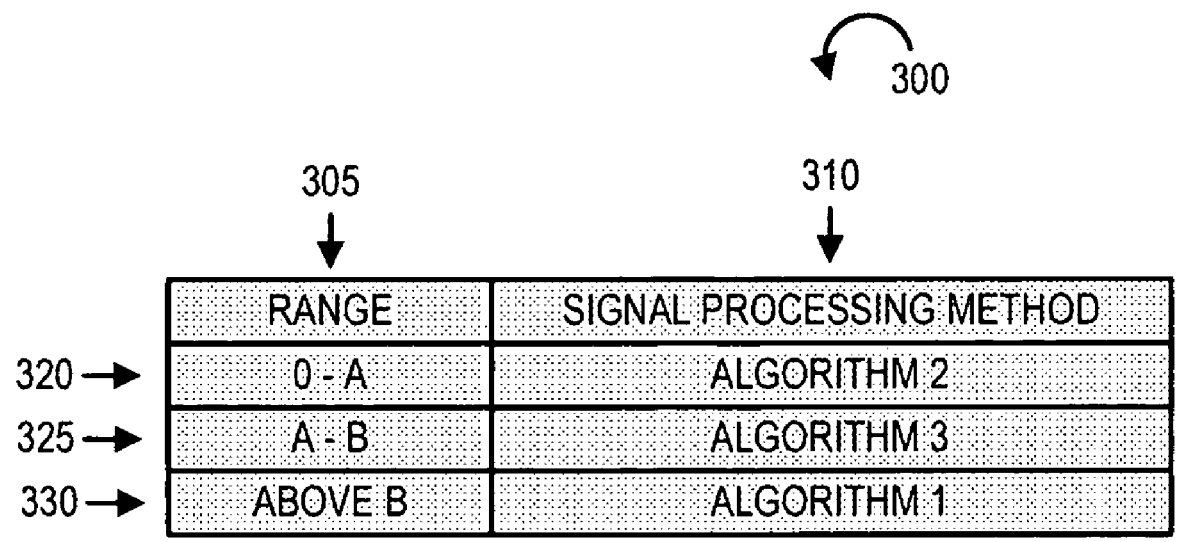
FIG. 3 illustrates an exemplary table used in accordance with an embodiment of the invention.

Method 200 comprises two signal processing algorithms, but the invention is not limited to two signal processing algorithms. FIG. 3 illustrates a table 300 that can be used by the swipe scanner 100 to choose from a plurality of available signal processing methods. Column 305 comprises speed ranges that the dataform can fall within, and column 310 comprises algorithms that correspond to the ranges. In general, the slower the dataform is moving the more sophisticated and time consuming the corresponding algorithm can be.

In an embodiment of method 200, the image scanner determines the speed range that the dataform falls within and then applies the corresponding algorithm. More specifically as shown in row 320, if the speed of the dataform is between or at 0 and "A", the swipe scanner 100 uses algorithm 2 to decode the dataform. If the speed of the dataform is above "A" and below or including "B", the swipe scanner 100 uses algorithm 3 to decode the dataform. If the speed of the dataform is above "B", the swipe scanner 100 applies the first signal processing algorithm. In alternate embodiments, the scanner can register a decode failure, and may ask the operator to try again at a slower speed. Table 300 can be expanded to include as many ranges and algorithms as desired. The letters "A" and "B" represent predetermined speeds that define the ranges of the table 300. In alternate embodiments they can represent statistical metrics measuring the difference between contiguous images.

Figure 4:
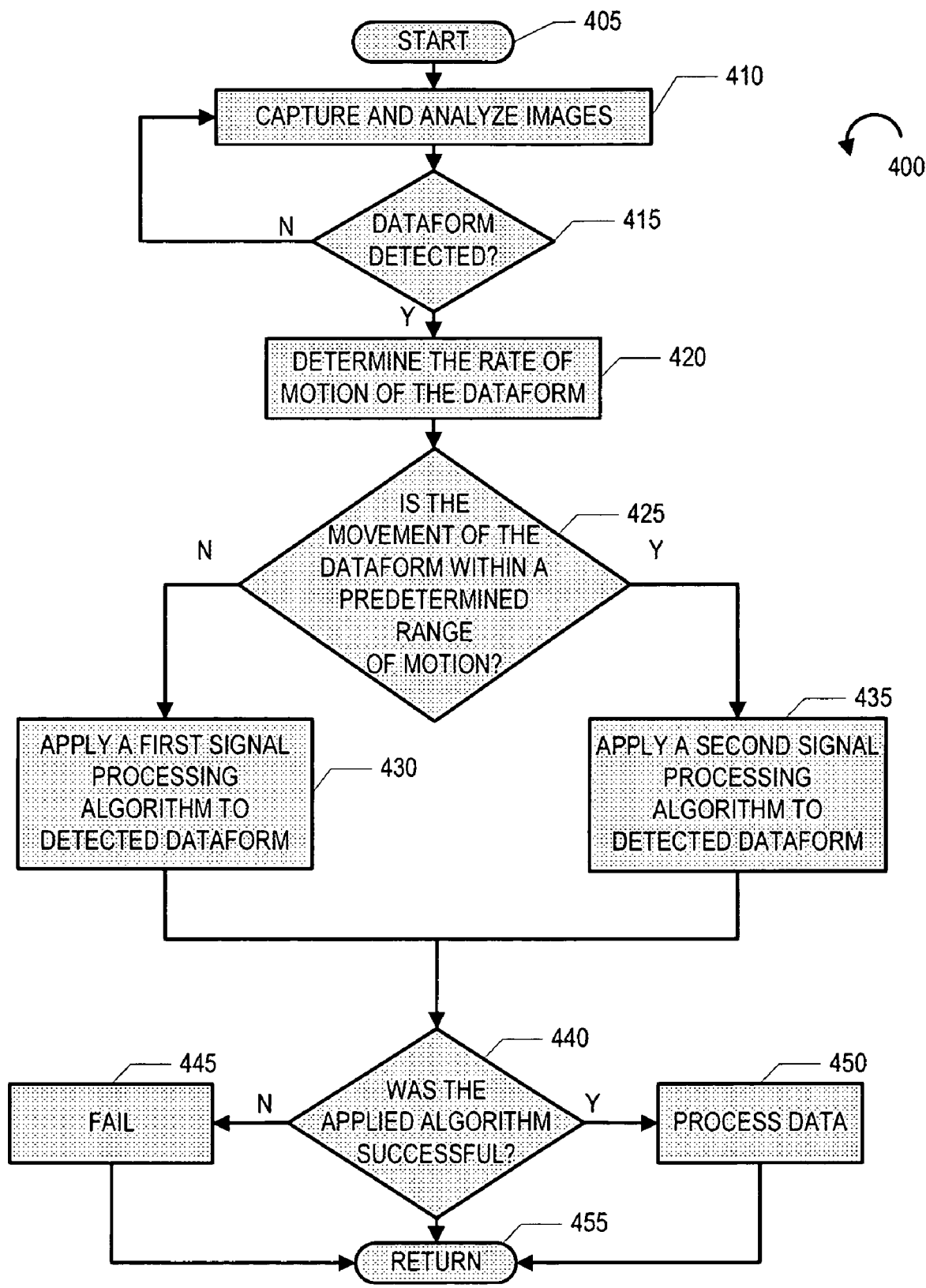
FIG. 4 illustrates a second exemplary dynamic signal processing method implemented according to a second embodiment of the invention.

FIG. 4 illustrates an alternate dynamic signal processing method 400, implemented in accordance with the invention. Method 400 starts in step 405 and proceeds to step 410. In step 410 the swipe scanner 100 captures and analyzes images. Proceeding to step 415, if a dataform is not detected in the image, processing returns to step 410, but if a dataform is detected processing proceed to step 420.

In contrast to dynamic signal processing method 200, method 400, in step 420, determines the rate of motion of the dataform before applying a signal processing algorithm to the detected dataform. After the swipe scanner 100 determines the rate of motion of the dataform, processing proceeds to step 425 where swipe scanner 100 determines if the speed of the dataform is within a predetermined range of motion, for example from 0 to "X". As mentioned earlier, in an alternate embodiment, the rate of motion of the dataform can be determined by an external speed measuring device prior to data collection module 100 scanning the dataform. This measurement can be used in step 425 to determine if the speed of the dataform is within the predetermined range of motion.

If the dataform is not within the predetermined range of motion, the swipe scanner 100 may not have the time to use a sophisticated algorithm, so processing proceeds to step 430, where a first, for example, fast and simple, signal processing algorithm 166 is applied to the detected dataform. Following step 430 processing proceeds to step 440.

Returning to step 425, if the speed of the dataform is within the predetermined range of motion, the swipe scanner 100 has the time to use a sophisticated algorithm, so processing proceeds to step 435, where a second, for example, more sophisticated, signal processing algorithm 167 is applied to the detected dataform. Following step 430, processing proceeds to step 440.

As with dynamic signal processing method 200, method 400 is not limited to two signal processing algorithms. Table 300 can be modified and used with method 400 to provide more than one range of motion and corresponding signal processing algorithm.

In step 440, the swipe scanner 100 determines whether the applied algorithm is successful. If the algorithm is not successful, processing proceeds to fail step 445 and then returns in step 455 to step 410. If the algorithm is successful, processing proceeds to process data step 450 and then returns in step 455 to step 410.

Figure 7:
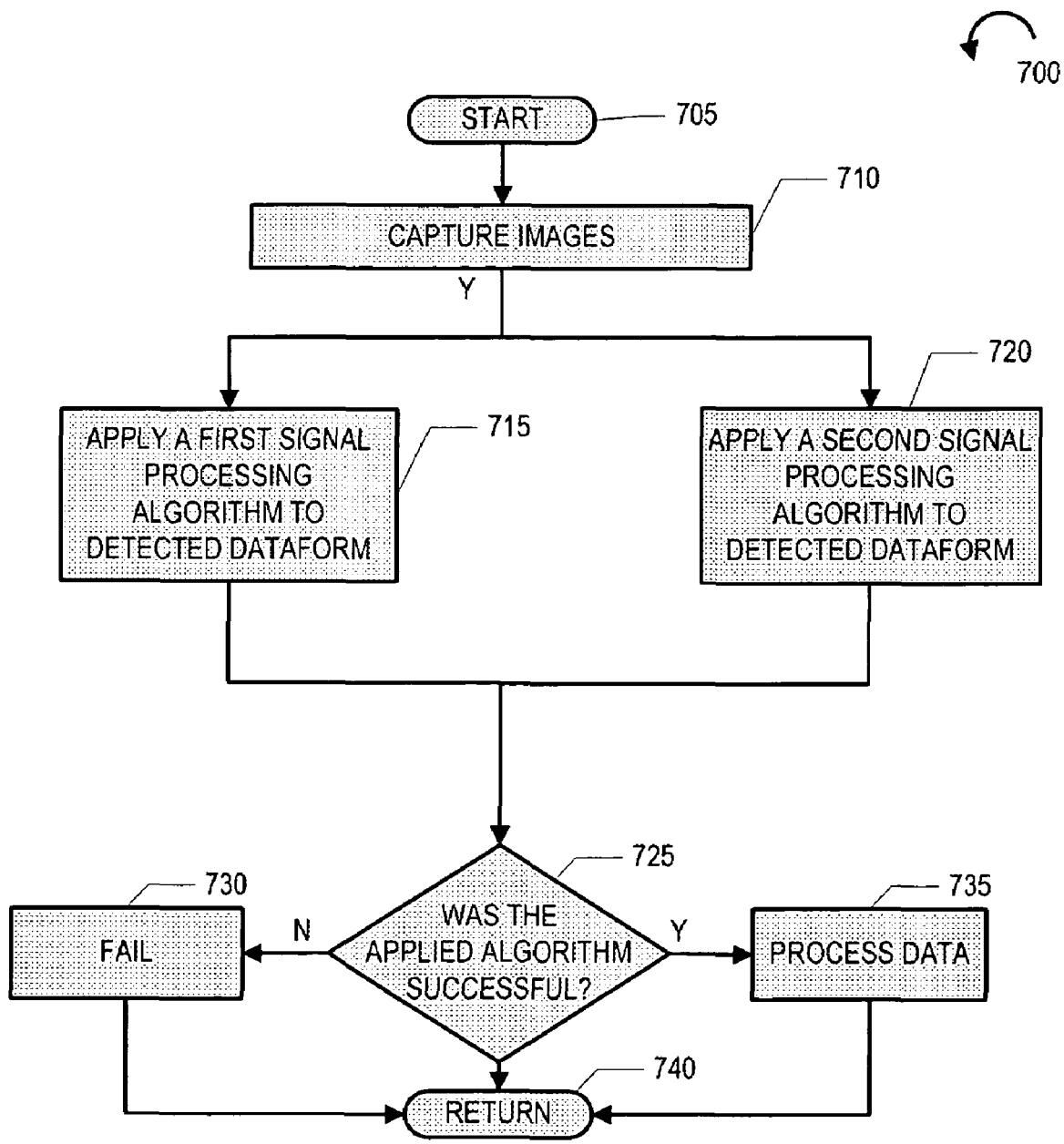
FIG. 7 illustrates an alternate exemplary dynamic signal processing method implemented according to a second embodiment of the invention.

FIG. 7 illustrates an alternate embodiment of a dynamic signal processing method 700 implemented in accordance with the invention in which the data collection module 100, for example, swipe scanner 100, decodes dataforms using two algorithms at the same time. Method 700 starts in step 705, for example, when the data collection module is powered on. Processing proceeds to step 710, where the scanner 100 begins to take images. Following step 710, processing proceeds in parallel to steps 715 and 720.

There are many ways to multi-task two processes between one device. One exemplary method is to use cooperative multi-tasking. In cooperative multitasking a first task uses the processing unit, for example, the CPU, until it reaches a logical break point in processing, and then hands the CPU to a second task. The second task uses the CPU until it reaches a logical break point in processing and hands the CPU back to the first task. The CPU is passed between the tasks until both the tasks are completed.

Another multi-tasking method is preemptive multi-tasking where each task is given a predetermined amount of time with the CPU. When the first task's time is up, the CPU is switched to the second task, even if the first task is not at a logical break point. This method leads to more predictable processing times. The scanner 100 uses an operating system (OS), and/or some other scheduling program to concurrently process the two signal processing algorithms.

Returning to method 800, the scanner in steps 715 and 720 concurrently processes a first signal processing algorithm and a second signal processing algorithm. The first signal processing algorithm is, in one embodiment, a fast and simple algorithm, while the second algorithm is a more sophisticated algorithm that takes more time to complete, but can decode more challenging dataforms. Since the first algorithm takes less time to complete than the second algorithm, the scanner 100 can perform steps 715-740 a plurality of times in the time it takes to perform steps 720-740 once. The OS switches between the processing of each of the algorithms.

Figure 8:
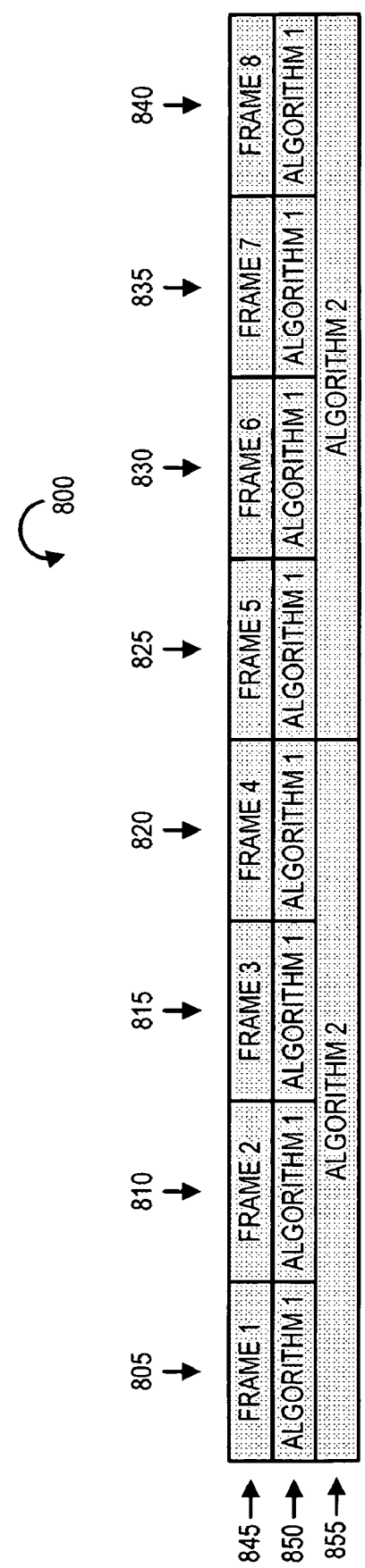
FIG. 8 illustrates an exemplary table showing the relative amounts of time used by some signal processing algorithms in accordance with an embodiment of the invention.

FIG. 8 illustrates a table 800 showing an exemplary processing timeline. The table 800 comprises three rows. The first row 845 illustrates the frame that the scanner 100 is in. The scanner 100 takes a picture at every frame, for example, at a rate of 30 frames per second. Table 800 illustrates processing for 8 frames 805-840. The second row 850 illustrates the time used to complete the first algorithm. As shown in FIG. 8, the first algorithm is designed to complete within each frame so that every image taken by the scanner is processed by at least the first algorithm. The third row 855 illustrates the time used to complete the second algorithm. The second algorithm is more time intensive than the first algorithm. Thus, the second algorithm takes four frames to complete. The second algorithm, in this exemplary embodiment, processing images from frame one 805, frame five 825, etc.

A simple dataform swiped in front of the scanner between any of the frames can be decoded by the first algorithm, but a challenging dataform is decoded when the dataform is swiped, as illustrated in exemplary table 800, between every four frames. If the dataform is moving a slower speed or is not moving, the dataform stays within the field of view of the scanner 100 for a longer length of time, giving the scanner 100 more time to capture an image of the dataform and to decode the dataform. Therefore, the scanner 100 can be used in a fast swipe configuration for simple codes and can also be used to decode more challenging dataforms. The scanner 100 can also provide limited fast swipe decoding for challenging dataforms if it passes the scanner 100 during a frame, for example frame five 825, when the second algorithm obtains an image to decode.

Since the same dataform may be decoded several times by one or both of the algorithms, the scanner can use known methods for recognizing a single dataform from multiple readings.

Returning to the description of method 700, when either the first or second algorithm completes, processing proceeds to step 725. If the completed algorithm is not successful, processing proceeds to fail step 730 and then returns in step 740 to step 710. If the algorithm is successful, processing proceeds to process data step 735 and then returns in step 740 to step 710. Processing of method 700 is not limited to two signal processing algorithms.

Figure 5:
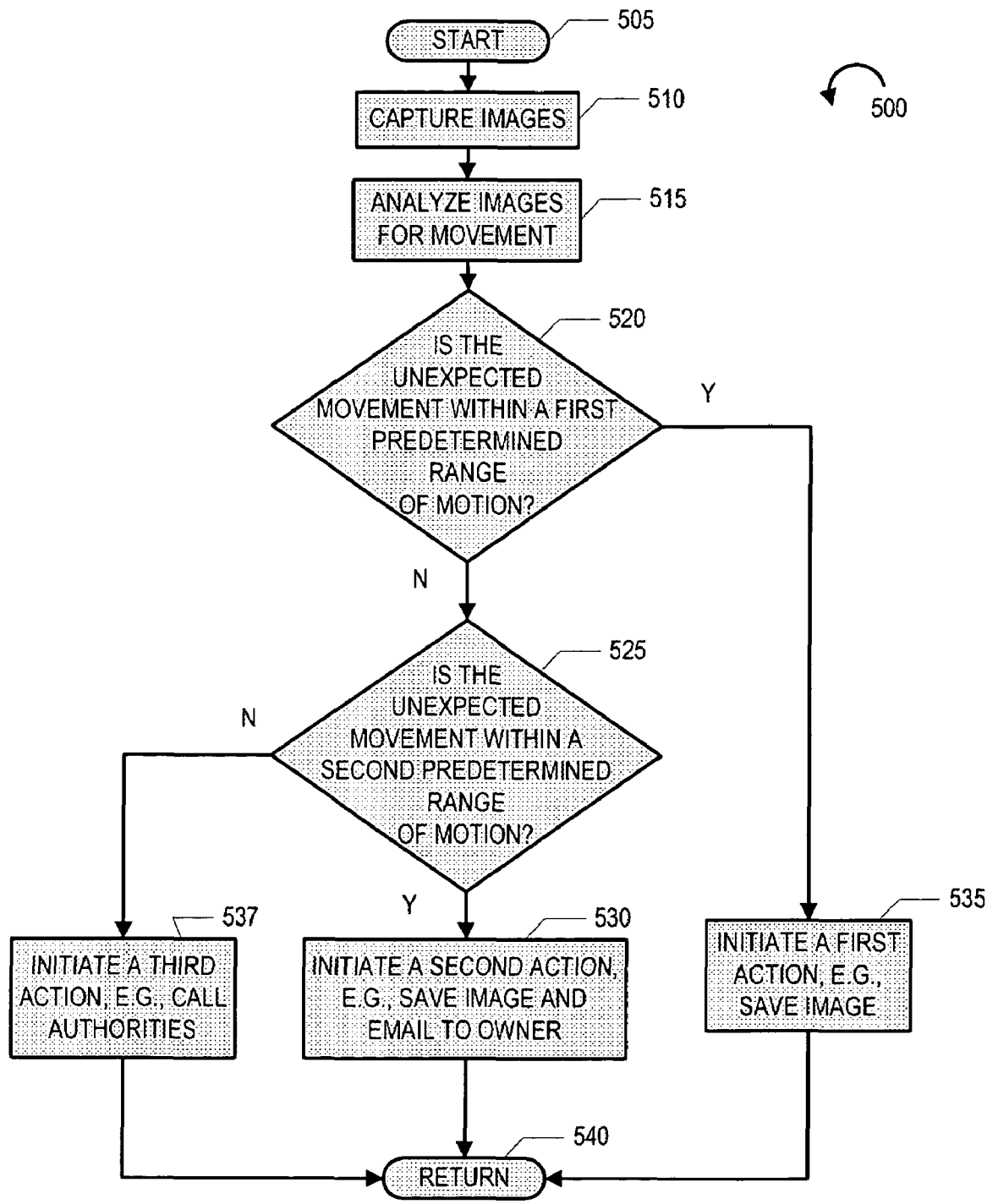
FIG. 5 illustrates an exemplary surveillance method implemented according to an embodiment of the invention.

When a store having swipe scanner 100 is closed for business, the scanner 100 can operate in a surveillance mode. FIG. 5 illustrates an exemplary surveillance method 500 that is implemented according to an embodiment of the invention. Surveillance method 500 starts in step 505, for example by flipping a switch from swipe scanner mode to surveillance mode. The swipe scanner can increase its field of view and/or use a night vision mode.

In step 510, swipe scanner 100 continuously captures images. Following step 510, processing proceeds to step 515 where the captured images are analyzed for motion. In some embodiments, the swipe scanner 100 can be programmed to act when it detects any motion, but in other embodiments the swipe scanner 100 can be programmed to ignore expected motion. For example, the movements of an animated window display can be incorporated into the analysis of the captured images and then ignored because that movement is expected. One exemplary method of incorporating expected movement is by limiting motion analysis to a subfield of the field of view, where no motion is expected. Busy areas of the field of view, for example, those including dynamic displays are left out of the motion analysis. When unexpected motion is detected processing proceeds from step 515 to step 520. Analyzing subfields of the field of view of the scanner is not limited to incorporating expected movement, in alternate embodiments, the motion detection can be limited to a subfield to increase performance, reduce stored image sizes, etc.

In step 520, the swipe scanner 100 determines if the unexpected movement is within a first predetermined range of motion. For example from 0 to "G." If the movement is within the first range, processing proceeds from step 520 to step 535, where the swipe scanner performs a first action. For example, the variable "G" can be set to a relatively low value so that detected motion in this range is slight. For slight movement, the swipe scanner 100 can be programmed to save the image and/or video for later analysis. After saving the image in step 535, the method 500 returns in step 540 to step 510, for further surveillance.

Returning to step 520, if the movement is not within the first range of motion, processing proceeds to step 525, where the swipe scanner 100 determines whether the detected motion is within a second range of motion, for example above "G" and below or including "H." If the motion is within the second range, processing proceeds to step 530, where the swipe scanner 100 initiates a second action. Since the movement in this range is greater, the swipe scanner 100 can be programmed to take further action. For example the swipe scanner 100 can be programmed to save an image of the detected motion and then transmit the image, for example via email, to the owner of the store. Following step 530, the method 500 returns in step 540 to step 510, for further surveillance.

Returning to step 525, if the detected movement is not within the first or second range of motion, i.e., it is above "G", then the movement is potentially serious, for example a burglar. In this situation, processing proceeds form step 525 to step 537, where the swipe scanner 100 can be programmed to contact the authorities, such as for example, the local police or security agency, as well as emailing an image of the motion to the storeowner and making an audible alarm. Following step 537, the method 500 returns in step 540 to step 510, for further surveillance.

The number of ranges and actions in the foregoing embodiment are exemplary. In alternate embodiments, the swipe scanner 100 can have more ranges of motion that correspond to a plurality actions in many different combinations.

Figure 6:
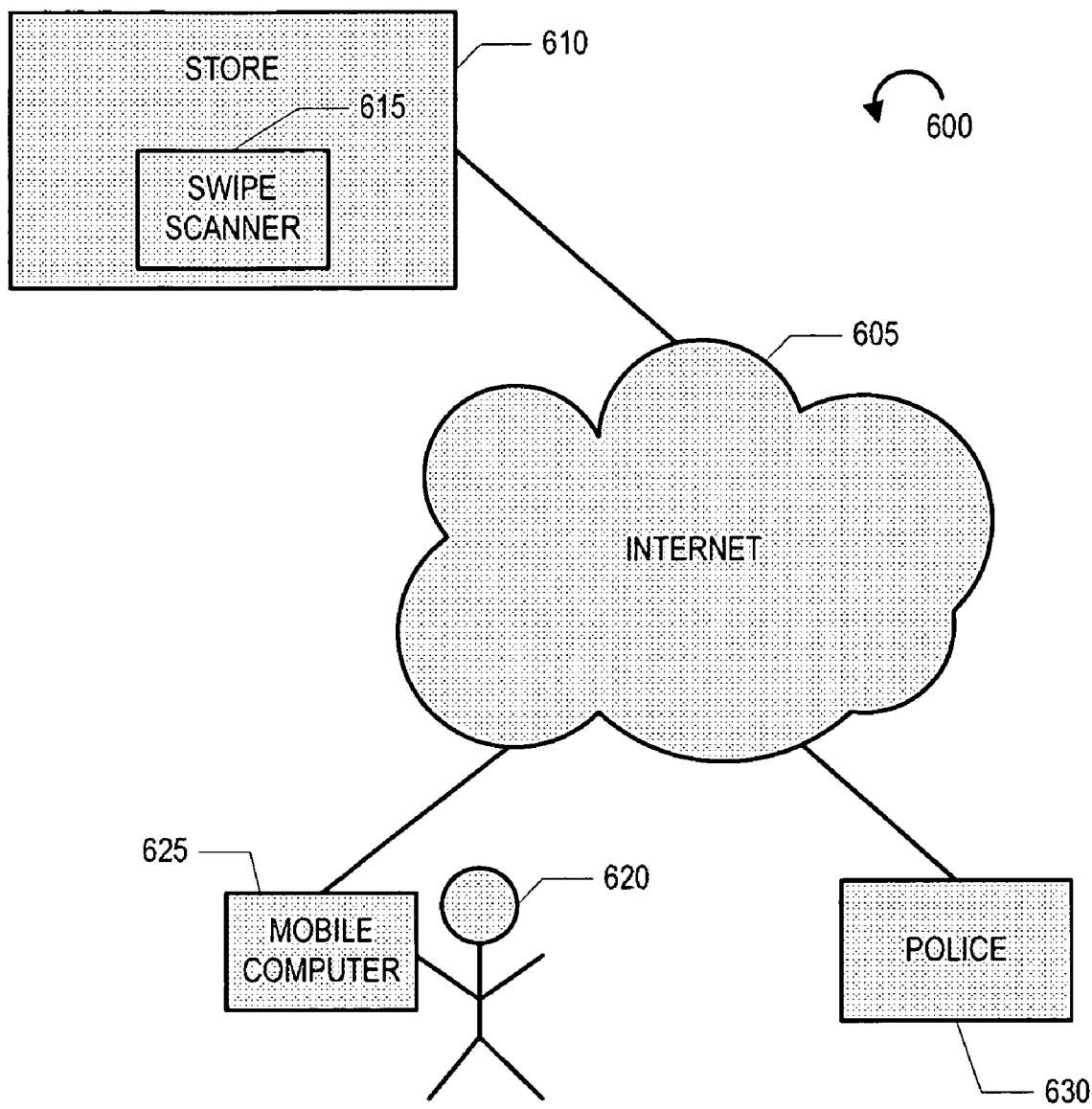
FIG. 6 illustrates an exemplary system where the surveillance embodiment of the invention can operate.

FIG. 6 illustrates an exemplary system 600, wherein the invention may be used. System 600 comprises an Internet cloud 605, a store 610 comprising an image scanner 615, a police station 630 and a storeowner 620 holding a mobile computer 625. If the swipe scanner 615 detects motion within a certain range, it can use the Internet 605 and other means to contact the police 630 and/or the storeowner 620. If the storeowner 620 has a mobile computer 625, such as, for example a laptop or Personal Digital Assistant (PDA), the storeowner 620 is notified of any unusual activity in his or her store. The owner can look at a picture of the motion and decide whether to ignore the alarm or call the authorities.

While there have been shown and described and pointed out fundamental novel features of the invention as applied to preferred embodiments thereof, it will be understood that various omissions and substitutions and changes in the form and detail of the disclosed invention may be made by those skilled in the art without departing from the spirit of the invention. It is the intention, therefore, to be limited only as indicated by the scope of the claims appended hereto.

What is claimed:

1. A method of dynamic signal processing comprising the steps of:
   capturing images within a field of view of a data collection apparatus;
   determining a rate of motion of a dataform passing said field of view of said data collection apparatus; and
   applying a signal processing algorithm to said captured images based on said determined rate of motion to generate output images from said captured images, wherein the signal processing algorithm is for decoding the dataform, wherein the applying of the signal processing algorithm includes applying a first dataform decoding algorithm that is selected if said rate of motion of said dataform is above a predetermined rate of motion, and applying a second dataform decoding algorithm that is selected if said rate of motion of said dataform is equal to or below said predetermined rate of motion.

2. The method of claim 1, wherein said first signal processing method is less time consuming than said second signal processing method.

3. The method of claim 1, wherein said dataform is a barcode.

4. The method of claim 1, wherein said data collection apparatus is a fast swipe image scanner, and wherein said scanner is a camera comprising an illumination module, a sensor module and an optical module.

5. The method of claim 1, wherein successive captured images are used to determine the rate of motion of said dataform.

6. The method of claim 1, wherein each of said plurality of signal processing algorithms is associated with a range of rates of motion, and said signal processing algorithm is chosen based on the rate of motion of the dataform.

7. The method of claim 1, further comprising the step of:
   applying said first dataform decoding algorithm to at least some part of said images prior to said step of determining said rate of motion of said dataform.

8. The method of claim 7, wherein the step of applying said dataform decoding algorithm based on said determined rate of motion comprises applying said second dataform decoding algorithm if the rate of motion of said dataform is within a predetermined, inclusive range of motion between 0 and "X", wherein "X" represents a threshold rate of motion where the data collection apparatus has time to use the second dataform decoding algorithm.

9. The method of claim 1, further comprising the step of:
applying said first dataform decoding algorithm to at least some part of said images concurrently with said step of determining said rate of motion of said dataform.

10. The method of claim 9, wherein the step of applying said dataform decoding algorithm based on said determined rate of motion comprises applying said second dataform decoding algorithm if the rate of motion of said dataform is within a predetermined, inclusive range of motion between 0 and "X", wherein "X" represents a threshold rate of motion where the data collection apparatus has time to use the second dataform decoding algorithm.

11. The method of claim 1, further comprising:
if the decoding of the dataform fails, instructing a user to scan the dataform at a slower speed.

12. A method of surveillance using a fast swipe image scanner comprising:
capturing images within a field of view of said fast swipe image scanner;
determining a rate of motion of an object depicted in at least some part of said images; and
initiating at least one action as a function of said determined rate of motion, wherein, if said determined rate of motion is within a first predetermined range of motion, saving the at least some part of said images and, if said determined rate of motion is within a second predetermined range of motion saving the at least some part of said images and transmitting said images, and, if said determined rate of motion is within a third predetermined range of motion, generating an external alert indicating the determining of the rate of motion.

13. The method of claim 12, wherein said plurality of actions comprises saving the images of the detected motion and transmitting said images to a predetermined location.

14. The method of claim 12, wherein each of said plurality of actions is associated with a range of rates of motion, and said at least one action is chosen based on the rate of motion or location of the object.

15. The method of claim 12, wherein said fast swipe scanner is programmed to expect motion from certain objects.

16. A data collection apparatus comprising:
a processing unit;
a scan module; and
a memory storing at least one process that is operative on said data collection apparatus for:
capturing images within a field of view of said data collection apparatus;
determining a rate of motion of a dataform passing said field of view of said data collection apparatus; and
applying a signal processing algorithm to said captured images based on said determined rate of motion to generate output images from said captured images, wherein the signal processing algorithm is for decoding the dataform, wherein the applying of the signal processing algorithm includes applying a first dataform decoding method that is selected if said rate of motion of said dataform is above a predetermined rate of motion, and applying a second dataform decoding method that is selected if said rate of motion of said dataform is equal to or below said predetermined rate of motion.

17. The data collection apparatus of claim 16, wherein said first dataform decoding method is less time consuming than said second dataform decoding method.

18. The data collection apparatus of claim 16, wherein said dataform is a barcode.

19. The data collection apparatus of claim 16, wherein said data collection apparatus is a fast swipe image scanner, wherein said scan module is a camera comprising an illumination module, a sensor module and an optical module.

20. The data collection apparatus of claim 16, wherein successive captured images are used to determine the rate of motion of said dataform.

21. The data collection apparatus of claim 16, wherein each of said plurality of signal processing algorithms is associated with a range of rates of motion, and said signal processing algorithm is chosen based on the rate of motion of the dataform.

22. The data collection apparatus of claim 16, wherein the process further comprising the step of:
applying said first dataform decoding algorithm to at least some part of said images prior to said step of determining said rate of motion of said dataform.

23. The data collection apparatus of claim 22, wherein the step of applying said first dataform decoding algorithm based on said determined rate of motion comprises applying said second dataform decoding algorithm if the rate of motion of said dataform is within a predetermined, inclusive range of motion between 0 and "X", wherein "X" represents a threshold rate of motion where the data collection apparatus has time to use the second algorithm.

24. The data collection apparatus of claim 16, wherein the process further comprising the step of:
applying said first dataform decoding algorithm to at least some part of said images concurrently with said step of determining said rate of motion of said dataform.

25. The data collection apparatus of claim 24, wherein the step of applying said first dataform decoding algorithm based on said determined rate of motion comprises applying said second dataform decoding algorithm if the rate of motion of said dataform is within a predetermined, inclusive range of motion between 0 and "X", wherein "X" represents a threshold rate of motion where the data collection apparatus has time to use the second dataform decoding algorithm.

26. The data collection apparatus of claim 16, wherein the process further comprises:
if the decoding of the dataform fails, instructing a user to scan the dataform at a slower speed.

27. A data collection apparatus comprising:
a processing unit;
a camera; and
memory storing at least one surveillance process that is operative on said data collection apparatus for:
capturing images within a field of view of said data collection apparatus;
determining a rate of motion of an object depicted in at least some part of said images; and
generating output images by performing an action upon said captured images, wherein said action is based on said determined rate of motion, wherein said data collection apparatus selects an action from a plurality of actions, wherein if said determined rate of motion is within a first predetermined range of motion, saving the at least some part of said images and, if said determined rate of motion is within a second predetermined range of motion, saving the at least some part of said images and transmitting said images, and, if said determined rate of motion is within a third predetermined range of motion, generating an external alert indicating the determining of the rate of motion.

28. The data collection apparatus of claim 27, wherein each of said plurality of actions is associated with a range of rates of motion, and said action is chosen based on the rate of motion or location of the object.

29. The method of claim 27, wherein said data collection apparatus is programmed to expect motion from certain objects.

30. A method of dynamic signal processing comprising the steps of:
   capturing images within a field of view of a data collection apparatus;
   determining a rate of motion of a dataform depicted in at least some part of said images; and
   generating output images by applying a first signal processing algorithm to said captured images and concurrently applying a second signal processing algorithm to said captured images, wherein the application of at least one of the first and second algorithms is based on said determined rate of motion, wherein the first signal processing algorithm and the second signal processing algorithm are for decoding the dataform.

31. The method of claim 30, wherein said data collection apparatus applies at least a third signal processing algorithm concurrently with said first and second signal processing algorithms.

32. The method of claim 30, wherein said dataform is a barcode.

33. The method of claim 30, wherein said data collection apparatus is a fast swipe image scanner wherein said scanner is a camera comprising an illumination module, a sensor module and an optical module.

34. The method of claim 30, further comprising:
   if the decoding of the dataform fails, instructing a user to scan the dataform at a slower speed.

35. The method of claim 30, wherein concurrent application of said first and second signal processing algorithms comprises preemptive multi-tasking.

36. The method of claim 35, wherein the first signal processing algorithm is applied to more images in a sequence of images than the second signal processing algorithm.

37. The method of claim 36, wherein the first signal processing algorithm is applied to substantially all the images captured by said data capture apparatus.

38. A data collection apparatus comprising:
   a camera;
   a memory; and
   a processor for controlling said data collection apparatus for at least,
   capturing images within a field of view of said data collection apparatus;
   determining a rate of motion of a dataform depicted in at least some part of said images; and
   applying a first signal processing algorithm to said captured images and concurrently applying a second signal processing algorithm to said captured images, wherein the application of at least one of the first and second algorithms is based on said determined rate of motion, wherein the first signal processing algorithm and the second signal processing algorithm are for decoding the dataform.

39. The data collection apparatus of claim 38, wherein said processor switches between at least two signal processing algorithms.

40. The data collection apparatus of claim 39, wherein said processor performs said switching by the means of an operating system.

41. The data collection apparatus of claim 40, wherein the first signal processing algorithm is applied to more images in a sequence of images than the second signal processing algorithm.

42. The data collection apparatus of claim 40, wherein the first signal processing algorithm is applied to substantially all the images captured by said data capture apparatus.

43. The data collection apparatus of claim 39, wherein said processor performs said switching by utilizing an interrupt system.

44. The data collection apparatus of claim 43, wherein the first signal processing algorithm is applied to more images in a sequence of images than the second signal processing algorithm.

45. The data collection apparatus of claim 43, wherein the first signal processing algorithm is applied to substantially all the images captured by said data capture apparatus.

46. The data collection apparatus of claim 39, wherein said processor performs said switching by the means of cooperation between the said first and second signal processing algorithms.

47. The data collection apparatus of claim 46, wherein the first signal processing algorithm is applied to more images in a sequence of images than the second signal processing algorithm.

48. The data collection apparatus of claim 46, wherein the first signal processing algorithm is applied to substantially all the images captured by said data capture apparatus.

49. The data collection apparatus of claim 46, wherein concurrently means that at least some of said first and second algorithms are completed within a time to capture an image in a sequence of said captured images.

* * * * *